United States Patent
Sun

(10) Patent No.: US 10,939,148 B2
(45) Date of Patent: *Mar. 2, 2021

(54) PLAYBACK SYNCHRONIZATION AMONG ADAPTIVE BITRATE STREAMING CLIENTS

(71) Applicant: ARRIS Enterprises LLC, Suwanee, GA (US)

(72) Inventor: Wendell Sun, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/584,117

(22) Filed: Sep. 26, 2019

(65) Prior Publication Data

US 2020/0021868 A1    Jan. 16, 2020

Related U.S. Application Data

(63) Continuation of application No. 15/454,823, filed on Mar. 9, 2017, now Pat. No. 10,469,885.

(Continued)

(51) Int. Cl.
*H04N 21/242* (2011.01)
*H04N 21/262* (2011.01)
(Continued)

(52) U.S. Cl.
CPC ..... *H04N 21/23655* (2013.01); *H04L 47/286* (2013.01); *H04L 65/4084* (2013.01);
(Continued)

(58) Field of Classification Search
CPC .............. H04N 21/26258; H04N 21/4825
See application file for complete search history.

(56) References Cited

U.S. PATENT DOCUMENTS 8,707,382 B2 * 4/2014 Wollmershauser .......................... H04N 21/44008
725/133
9,832,497 B2 * 11/2017 Stokking .......... H04N 21/23418
(Continued)

FOREIGN PATENT DOCUMENTS

EP    3148197 A1    3/2017

OTHER PUBLICATIONS

Joint Technical Committee, "Information technology—Dynamic adaptive streaming over HTTP (DASH)—Part 1: Media presentation description and segment formats, Amendment 4: Segment Independent SAP Signalling (SISSI), MPD chaining, MPD reset and other extensions", ISO/IEC 23009-1:2014/AMD 4, Oct. 23, 2015, 60 pages.

(Continued)

*Primary Examiner* — Brian T Pendleton
*Assistant Examiner* — Frank Johnson
(74) *Attorney, Agent, or Firm* — Chernoff, Vilhauer, McClung & Stenzel, LLP

(57) ABSTRACT

In one embodiment, a method provides a manifest for a media program to a client. The manifest includes a set of bitrate representation links that correspond to a set of bitrates. A pointer is maintained to at least a portion of a current segment that is currently being presented in the media program. A request is received using a bitrate representation link in the set of bitrate representation links. The method then selects at least the portion of the current segment using the pointer for the bitrate that corresponds to the bitrate representation and sends the at least the portion of the current segment to the client.

9 Claims, 14 Drawing Sheets

Related U.S. Application Data

(60) Provisional application No. 62/311,547, filed on Mar. 22, 2016, provisional application No. 62/363,522, filed on Jul. 18, 2016.

(51) Int. Cl.

| | | |
|---|---|---|
| *H04N 21/482* | (2011.01) | |
| *H04N 21/2365* | (2011.01) | |
| *H04L 29/06* | (2006.01) | |
| *H04N 21/2343* | (2011.01) | |
| *H04N 21/239* | (2011.01) | |
| *H04N 21/438* | (2011.01) | |
| *H04N 21/44* | (2011.01) | |
| *H04N 21/442* | (2011.01) | |
| *H04L 12/841* | (2013.01) | |
| *H04N 21/2187* | (2011.01) | |
| *H04N 21/2387* | (2011.01) | |
| *H04N 21/845* | (2011.01) | |
| *H04N 21/858* | (2011.01) | |

(52) U.S. Cl.
CPC ............ *H04L 65/602* (2013.01); *H04L 65/80* (2013.01); *H04N 21/2187* (2013.01); *H04N 21/2387* (2013.01); *H04N 21/2393* (2013.01); *H04N 21/23439* (2013.01); *H04N 21/26258* (2013.01); *H04N 21/4381* (2013.01); *H04N 21/44004* (2013.01); *H04N 21/44209* (2013.01); *H04N 21/8455* (2013.01); *H04N 21/8456* (2013.01); *H04N 21/8586* (2013.01)

(56) References Cited

U.S. PATENT DOCUMENTS

| | | | |
|---|---|---|---|
| 9,942,215 B2 | 4/2018 | Coburn | |
| 10,021,438 B2* | 7/2018 | Kipp | .................... H04N 21/242 |
| 2012/0140645 A1 | 6/2012 | Bonta | |
| 2012/0198506 A1 | 8/2012 | Joe | |
| 2014/0282777 A1 | 9/2014 | Gonder | |
| 2014/0344468 A1 | 11/2014 | Saremi | |
| 2015/0195599 A1 | 7/2015 | Su | |
| 2015/0256583 A1 | 9/2015 | Rosenzweig et al. | |
| 2015/0264096 A1 | 9/2015 | Swaminathan | |
| 2015/0289003 A1 | 10/2015 | Huber | |
| 2015/0358375 A1 | 12/2015 | Coburn | |
| 2016/0119657 A1 | 4/2016 | Sun | |
| 2017/0195744 A1* | 7/2017 | Engel | ................. H04N 21/4825 |
| 2017/0289639 A1* | 10/2017 | Reisner | ................ H04N 21/812 |
| 2018/0324480 A1 | 11/2018 | Schoen | |
| 2019/0182554 A1 | 6/2019 | Schupak | |

OTHER PUBLICATIONS

Viswanathan Swaminathan et al, "Draft International Standard for 23009-6: DASH with Server Push and WebSockets", ISO/IEC JTC1/SC29/WG11, Jul. 11, 2014, 47 pages, San Diego, CA.

R. Fielding et al, "Chunked Transfer Encoding, Section 4.1 from Hypertext Transfer Protocol (HTTP/1.1): Message Syntax and Routing", Internet Engineering Task Force (IETF), Jun. 2014, 74 pages.

Viswanathan Swaminathan et al, "Draft International Standard for 23009-6: DASH with Server Push and WebSockets", ISO/IEC JTC1/SC29/WG11, Mar. 11, 2016, 46 pages, San Diego, CA.

Joint Technical Committee, "Information technology—Dynamic adaptive streaming over HTTP (DASH)—Part 1: Media presentation description and segment formats, Amendment 4: Segment Independent SAP Signalling (SISSI), MPD chaining, MPD reset and other extensions", ISO/IEC 23009-1:2014/AMD 4, Jan. 5, 2017, 60 pages.

V. Brandenberg, et al., "Models for adaptive-streamng-aware CDN Interconnection; draft-brandenburg-cdni-has-02.txt", Internet Engineering Task Force, IETF, Standardworkingdraft, Internet Society (ISOC), Jun. 28, 2012, pp. 1-42.

DVB Organization, "IP Multicast Adaptive Bit Rate Architecture Technical Report: OC-TR-IP-MULTI-ARCH-V01-1411121.pdf", DVB, Digital Video Broadcasting, Jun. 23, 2015, pp. 28-30, 49.

* cited by examiner

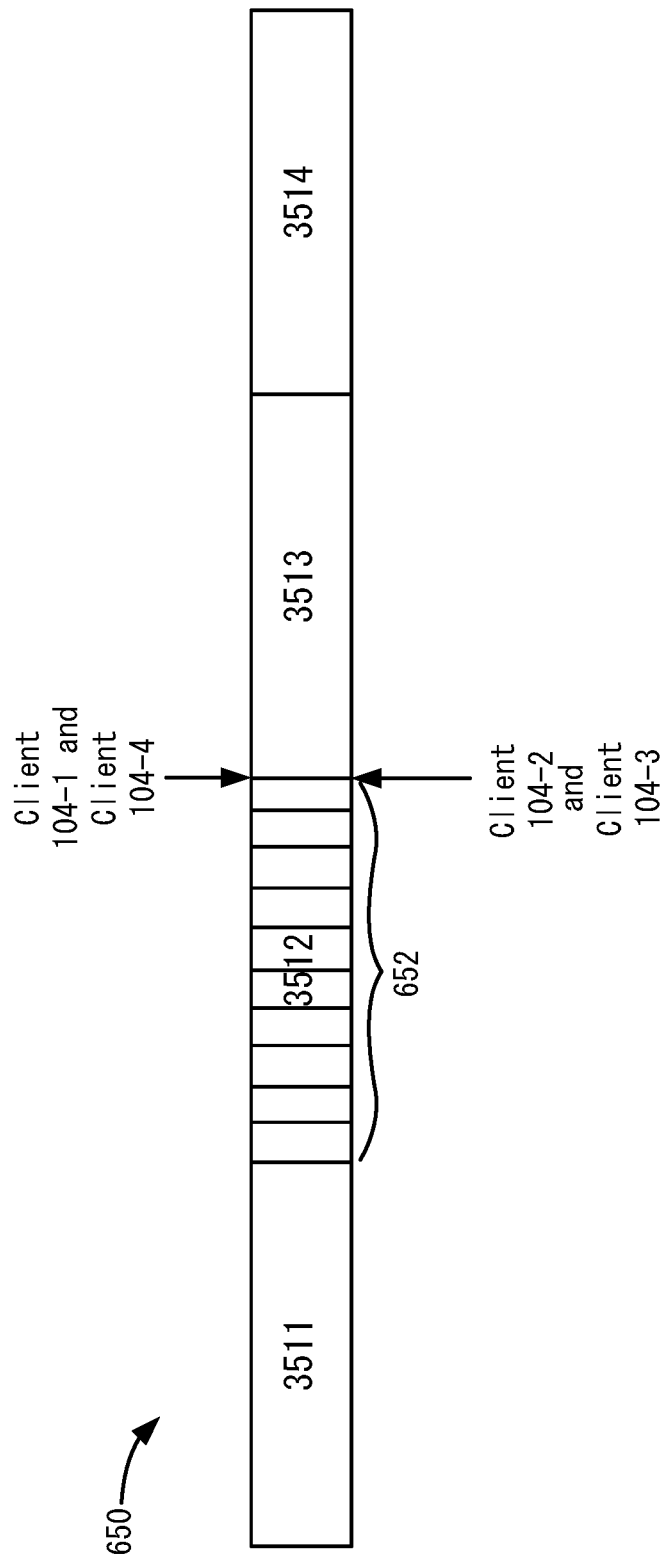

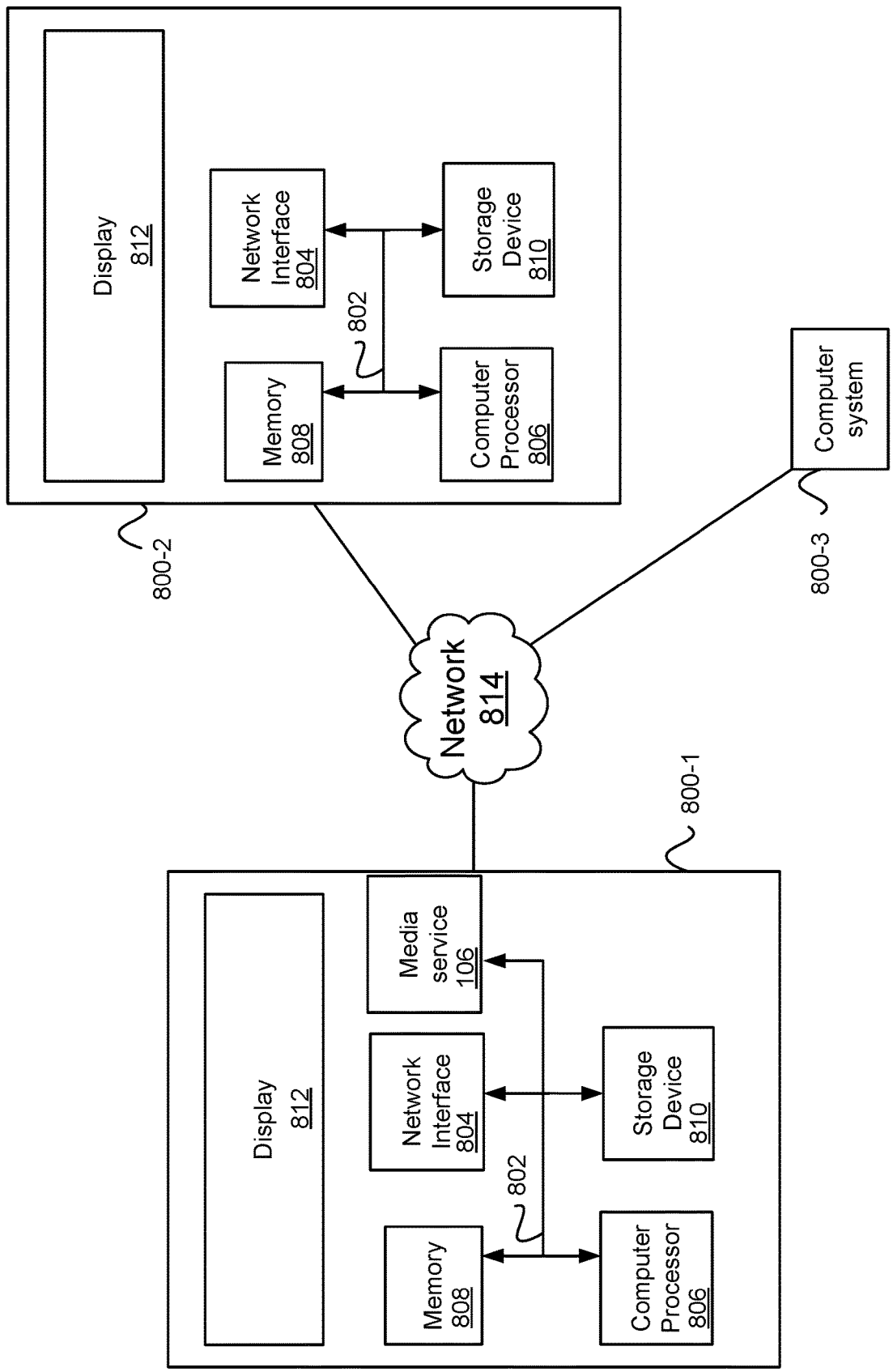

PLAYBACK SYNCHRONIZATION AMONG ADAPTIVE BITRATE STREAMING CLIENTS

CROSS-REFERENCES TO RELATED APPLICATIONS

The present application is a continuation of U.S. patent application Ser. No. 15/454,823 filed on Mar. 9, 2017, which claims priority to U.S. Provisional App. No. 62/311,547, entitled "Method to Achieve Playback Synchronization among HTTP Adaptive Streaming Clients", filed Mar. 22, 2016, and U.S. Provisional App. No. 62/363,522, entitled "Method to Achieve Playback Synchronization among HTTP Adaptive Streaming Clients", filed Jul. 18, 2016, the contents of all of which are incorporated herein by reference in its entirety.

BACKGROUND

In adaptive bitrate streaming, a client device drives the selection of which media segment in which bitrate to download and play. For example, a manifest file lists distinct uniform resource locators (URLs) for each media segment that can be requested by the client in each bitrate. The client can use the available bandwidth to select an appropriate bitrate and then can select the URL for a segment in that bitrate for download.

For live and linear media programs, the above approach may cause some problems for the quality of viewer experience. For example, one problem is an unsynchronized viewing experience among clients may occur. Because each client acts independently and starts pulling media segments on its own timeline, there could be a difference of viewing time between multiple clients of two segment lengths or even larger. For a popular ten second long segment design, this implies a difference of more than 20 seconds among viewing users. Live and linear media programs are meant to be played in substantially real-time, such as shortly after a live event occurs, and viewed by all users in the same time. However, if multiple clients are shown the same live and linear media program in the same location, the clients may be requesting and receiving the same media segments at different times in the current adaptive bit rate approach. This causes the playing of the media program to be unsynchronized for those clients.

BRIEF DESCRIPTION OF THE DRAWINGS

FIG. 6D is an example describing the latency when multiple clients request a bitrate representation from the media presentation and the current segment pointer and chunked transfer method is used according to one embodiment.

FIG. 8 illustrates an example of a special purpose computer systems configured with media service according to one embodiment.

DETAILED DESCRIPTION

Figure 1:
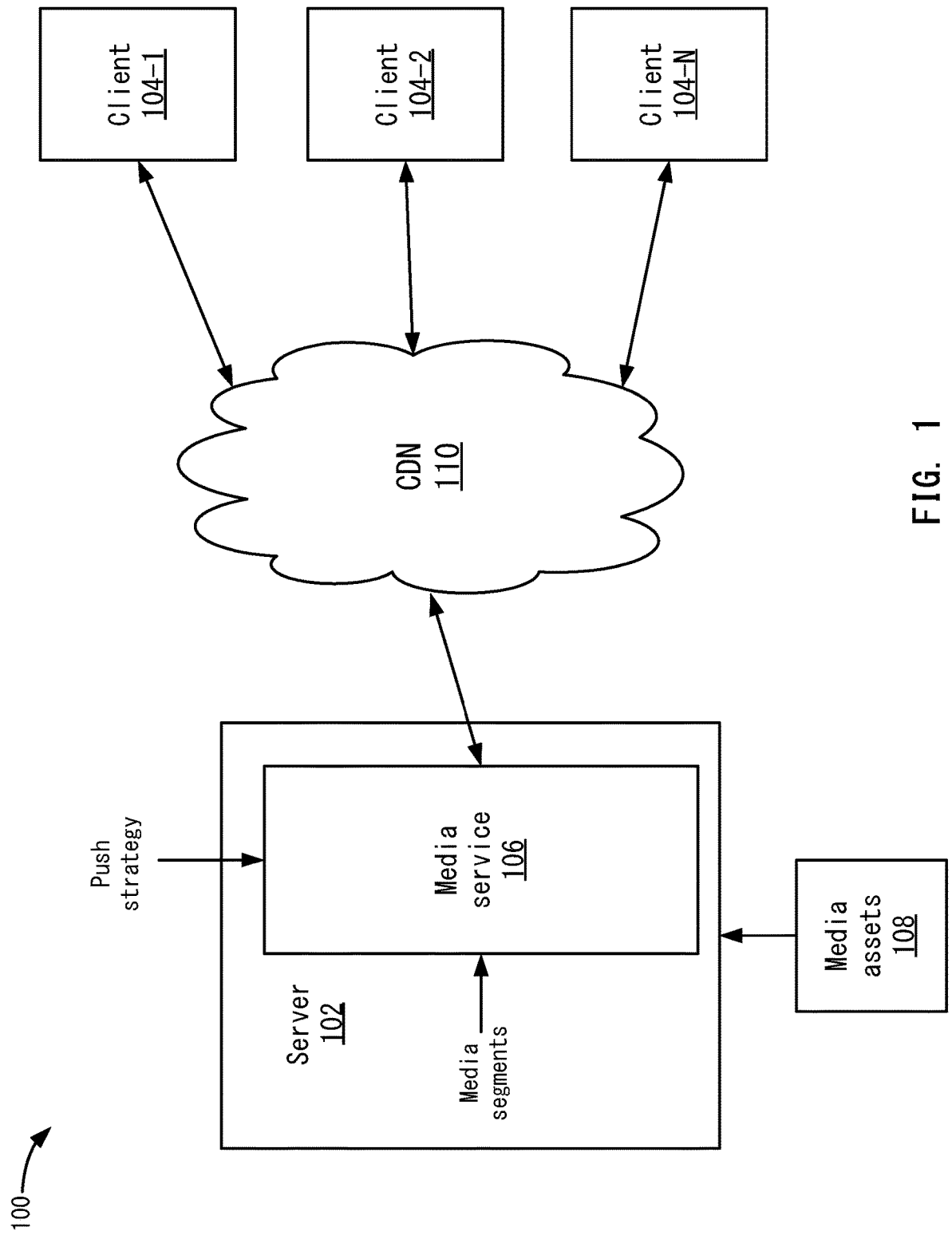
FIG. 1 depicts a simplified system for using bitrate representation links according to one embodiment.

Described herein are techniques for a video delivery system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a server-side synchronization of dynamic adaptive bitrate (ABR) streaming for media segments in a media program. The server provides a manifest file that lists only different bitrate representations from a dynamic adaptive bitrate model (e.g., a low bitrate representation, a medium bitrate representation, and a high bitrate representation). The manifest file does not include individual media segment links, such as media segment uniform resource locators (URLs). Rather, a single bitrate representation link (e.g., URL) is provided for each bitrate representation in the manifest file. For example, three bitrate representation links are provided for the low bitrate, the medium bitrate, and the high bitrate, respectively. A client selects the bitrate representation link for the bitrate the client desires and sends a media request for the bitrate to the server using the bitrate representation link.

The server receives bitrate representation link and then controls the streaming of which media segments are sent to the client and any other clients that request the media program. To synchronize the streaming among clients, the server determines a current segment. At any moment, there is only one media segment that the server considers the current segment. In one embodiment, the current segment is the segment that matches the current media presentation time for each bitrate stream. To keep track of the current segment, the server may maintain a pointer to the current segment that is moved along the timeline of media segments as the media presentation of the media program proceeds. When the server receives a request for the bitrate representation, the server determines the current segment in the requested bitrate and sends that current segment to the client. By maintaining the current segment at the server, the unsynchronized playback of the media program presentation among multiple clients may be reduced as will be described in more detail below.

Clients may also switch bitrates after streaming starts using the bitrate representation links in the manifest file. For example, when a different bitrate is desired, the client sends a request for a different bitrate using a different bitrate representation link. When the server receives the request, the server can determine a current segment in the new bitrate and start sending media segments in the new bitrate. In one embodiment, the server waits to switch bitrates at an appropriate boundary, such as at a media segment boundary.

FIG. 1 depicts a simplified system 100 for using bitrate representation links according to one embodiment. System 100 includes a server 102, a content delivery network (CDN) 110, and clients 104. Although one instance of server 102 is shown, multiple servers 102 may be provided. Also, clients 104-1-104-N are shown, but any number of clients may be provided in the same location or in different locations.

Clients 104 may be different devices that can play media segments of a media program. For example, clients include mobile devices (e.g., tablet devices, laptop computers, and mobile phones), living room devices (e.g., set top boxes, consoles, and televisions), personal computers, and other computing devices that can play a media program. Clients 104 include browsers and media players (not shown) that can communicate with server 102 to play media programs. Media programs may be videos, but may also include other content, such as audio.

Server 102 is a computing device that receives media segments for media programs and can provide those media segments to clients 104. Server 102 may be a single origin server for clients 104 and provide media segments via broadcast or multicast. In one embodiment, server 102 provides media segments for a time sensitive media program, such as a live media program or a linear media program. A live media program may be a video that is showing a live event. Also, a linear program is a video that is supposed to be played in a set time slot, such as from 7:30 p.m. to 8:00 p.m.

Clients 104 and server 102 may communicate through CDN 110, which may include cache servers that are used to deliver the media program to clients 104. Clients 104 and server 102 use a protocol to communicate, such as a Hyper-Text Transfer Protocol (HTTP). In one embodiment, server 102 is an HTTP server that can respond to HTTP requests from clients 104. Server 102 may use Internet Protocol (IP) multicast to deliver the segments to clients 104, in which an IP multicast proxy server may exist in the network. Also, direct end to end HTTP connections may be used between the clients and server. Different versions of HTTP may also be used, such as HTTP/1 and HTTP/2. In one embodiment, there are two HTTP/2 persistent connections, one between the client 104 and the CDN 110, and one between the CDN 110 and the server 102. In addition, a tunneled HTTP/2 connection may also be established between the client 104 and server 102, for live streaming that requires low latencies.

Server 102 includes a media service 106 that can determine which media segments to send to clients 104. Media service 106 may be a plug-in function in server 102 that provides a dynamic adaptive bitrate streaming service to clients 104 using a push strategy. The adaptive bitrate streaming service allows clients 104 to request different bitrates of the media program. Examples of adaptive bitrate streaming include HTTP live streaming (HLS), Dynamic Adaptive Streaming over HTTP (DASH), HTTP Smooth Streaming (HSS), HTTP dynamic streaming (HDS), but any adaptive bitrate streaming protocol may be used. For example, clients 104 may analyze the available bandwidth and can then select from the available bitrates. If high, medium, and low bitrates are provided, then clients 104 may determine which bitrate may be optimal based on the available bandwidth. For example, if the available bandwidth is high, then a client 104 may want to request the high bitrate. However, if the available bandwidth is low, then client 104 may want to request the low bitrate.

Media service 106 executes a push strategy where the server controls which segments to send to clients 104. This is referred to as a server-centric push strategy and will be described in more detail now.

Media service 106 provides a manifest (e.g., a media presentation description (MPD)) to clients 104 that lists different bitrate representations that can be requested for the media program. The manifest lists only different bitrate representations with corresponding bitrate representation links that can be used by client 104 to request the selection of a bitrate stream. Links that identify individual segments (or groups of segments) in the media program are not provided in the manifest. Rather, the bitrate representation link may be a virtual segment link that in effect requests the current segment from server 102 instead of a specific media segment. Thus, clients 104 cannot request an individual segment or group of segments from media service 106 using a unique link to that segment. Rather, clients 104 then select one of the bitrate representations in the manifest and send a request to server 102 using the bitrate representation link for the selected bitrate.

Media service 106 receives the request and can determine the current segment for the media program. Media service 106 receives media segments for the media program from media assets 108 and can maintain a single-threaded timeline for the media program (and any other media programs offered by server 102). The single-threaded timeline follows a media presentation timeline of when the media program should be presented. Media service 106 maintains a pointer to a current segment for each bitrate. The current segment is the segment that corresponds to the current media program presentation time. For example, each media segment may be a certain length, such as 10 seconds. During the 10 seconds that the media segment is being presented, the pointer points to that media segment. When the 10 seconds passes and the current media presentation is presenting a new media segment, then the pointer moves to the next media segment.

Once receiving the request for a bitrate representation, media service 106 determines the current segment for the bitrate that was requested based on the pointer to the current segment. Then, media service 106 sends the current segment to client 104.

As other clients 104 send requests for different bitrates, media service 106 uses the pointer to determine the current segment and sends the current segment to the other clients. By using the bitrate representation link and the pointer to the current segment, the latency among clients 104 displaying media segments is reduced to around the media segment length or less. That is, clients 104 may be unsynchronized at a maximum of the media segment length.

Manifest File

Figure 2:
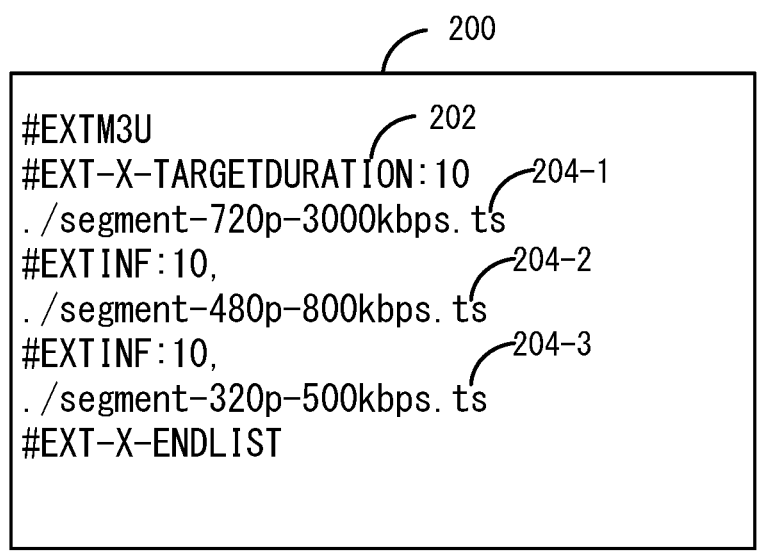
FIG. 2 shows an example of a manifest file according to one embodiment.

FIG. 2 shows an example of a manifest file 200 according to one embodiment. At 202, manifest file defines the duration of the segment as 10 seconds; however, other durations may be provided. The duration for the segments in each bitrate is 10 seconds in this case.

Manifest file 200 also includes bitrate representation links for different bitrate representations at 204-1, 204-2, and 204-3. The links may be URLs that clients 104 can use to request the respective bitrate representations. The different bitrates may be a low bitrate, a medium bitrate, and a high bitrate, but any number of bitrates may be used. Manifest file 200 includes 500 k bitrate per second (bps), 800 k bps, and 3000 k bps bitrate representations, but other bitrate values may be offered. Further, the bitrate representation may also include different quality levels, such as a low quality level, medium quality level, and high quality level, which may be 320p, 480p, and 720p, respectively, but other quality levels may also be provided.

Links 204 do not reference any specific media segment in the media program. Rather, links 204 reference the bitrate representation that is being requested. The links may be considered virtual links because the links do not reference a specific media segment. In one embodiment, nowhere in manifest file 200 is a specific media segment referenced. Accordingly, server 102 keeps track of which segment to send to clients 104 when clients 104 request a bitrate representation.

Current Segment Status

Figure 3A:
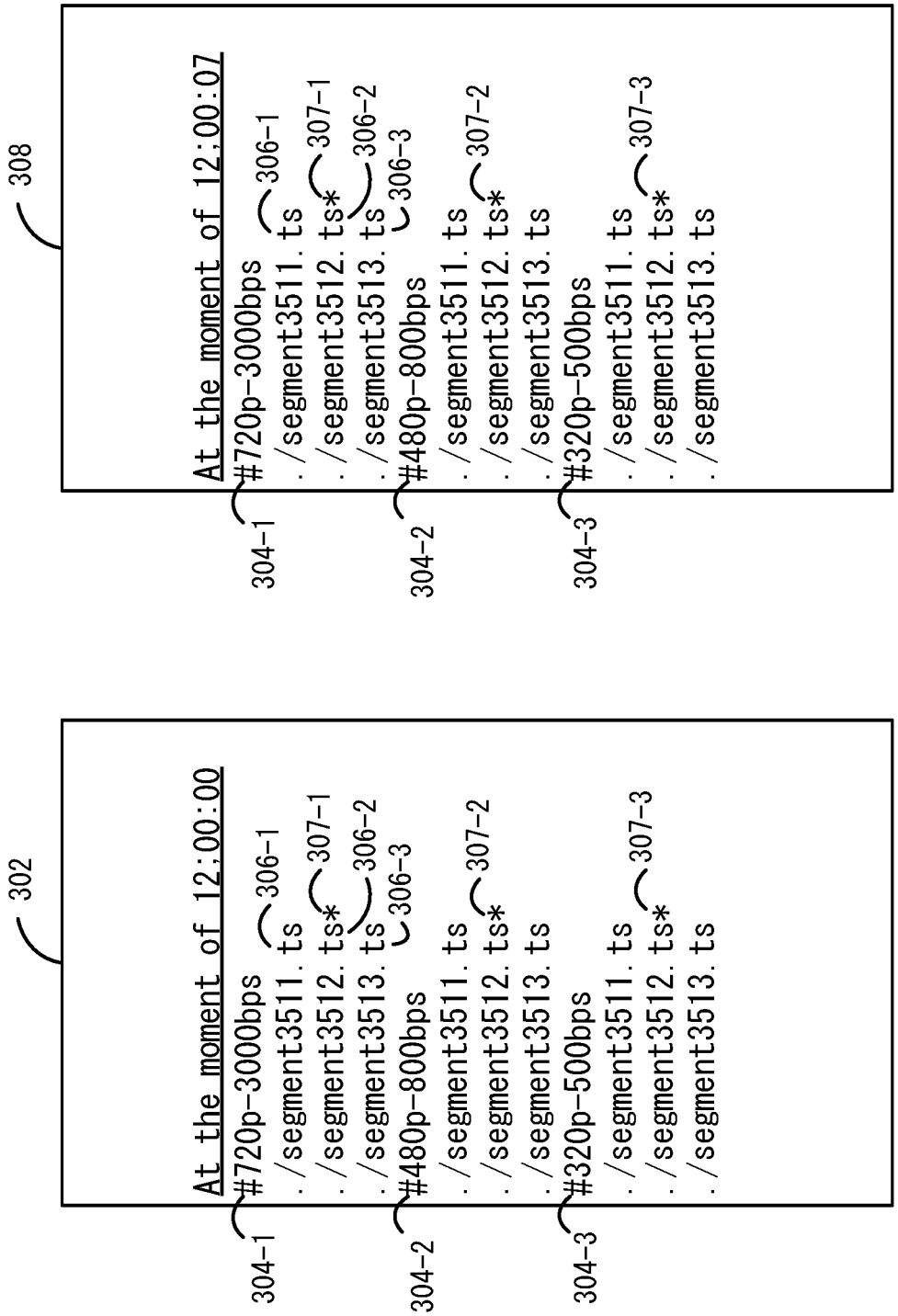
FIGS. 3A and 3B illustrate the use of the current segment according to one embodiment.
Figure 3B:
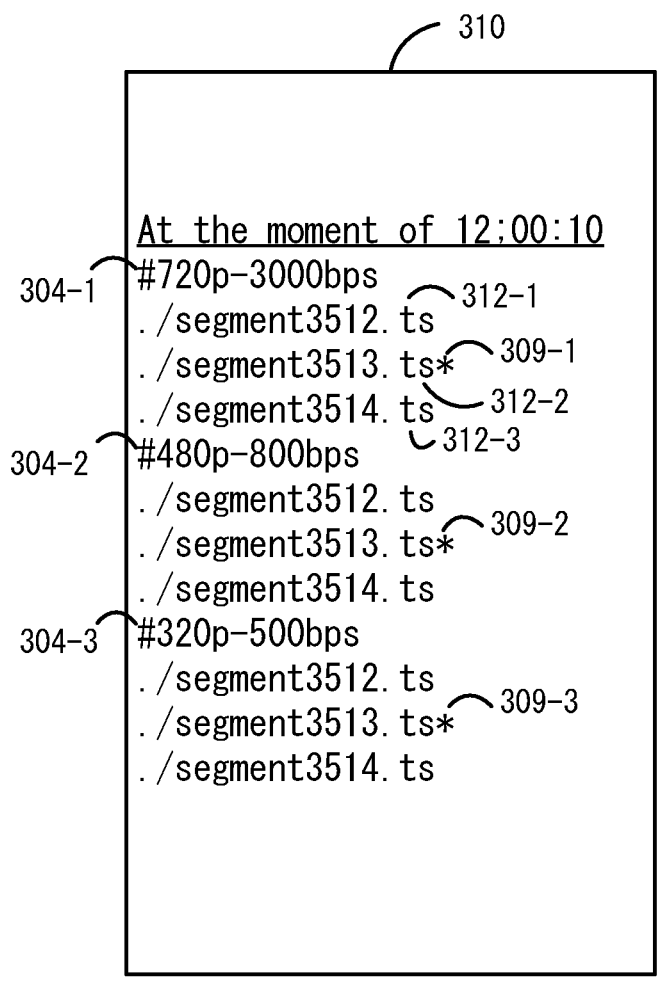

Because clients 104 do not request specific segments (or groups of segments), server 102 receives media segments and maintains the current status of the available media segments, such as by using a pointer to a current segment. The pointer may be implemented using any technique that stores the status of the current segment. FIGS. 3A and 3B illustrate the use of the current segment according to one embodiment. The structures in FIGS. 3A and 3B may be maintained at server 102 to keep track of the media presentation. These structures are different from the manifest used by clients 104.

In FIG. 3A, at 302, the current segment at the moment of a time of 12:00:00 for the media presentation is shown. Different bitrate representations are shown at 304-1, 304-2, and 304-3, which correspond to the high bitrate stream, medium bitrate stream, and low bitrate stream, respectively. Each bitrate representation includes links for media segments for the respective bitrate representation. For example, for a high bitrate stream at 304-1, a segment 3511 is shown at 306-1; a segment 3512 is shown at 306-2; and a segment 3513 is shown at 306-3. These may be three consecutive segments that are displayed in the order of segment 3511, segment 3512, and segment 3513 for the media program. Each bitrate representation includes the same segments (e.g., the same content), but the different bitrate representations are encoded at different bitrates and/or quality.

The pointer "*" at 307-1-307-3 in FIG. 3A indicates where the pointer is currently located to identify the current segment. At the time 12:00:00, the current segment is segment 3512 and a pointer "*" is shown next to segment 3512 in all three bitrate representations. In one embodiment, a pointer to the current segment in all three bitrate representations may be used. In another embodiment, the pointer may identify the segment number, such as segment 3512, and media service 106 can retrieve the identified segment from any bitrate stream.

Next, at 308, the moment of the time 12:00:07 in the media presentation is shown. Here, the pointer to the current segment is still segment 3512. The pointer has not moved to the next segment because the media presentation is still currently playing the segment 3512 because the segment length is ten seconds.

In FIG. 3B, at 310, the moment at the time 12:00:10 in the media presentation is shown. In this case, for the high bitrate stream, three segments shown at 312-1-312-3 are segments 3512, 3513, and 3514, respectively. The pointer to the current segment is now pointing to segment 3513 at 309-1. This is because 10 seconds have elapsed since the start of playing segment 3512 and thus the next current segment is now being presented in the media program. Media service 106 moves the pointer to the current segment to segment 3513 in this case. The other bitrate streams also show the same segments and pointer being located at segment 3513 at 309-2 and 309-3, respectively.

Figure 4A:
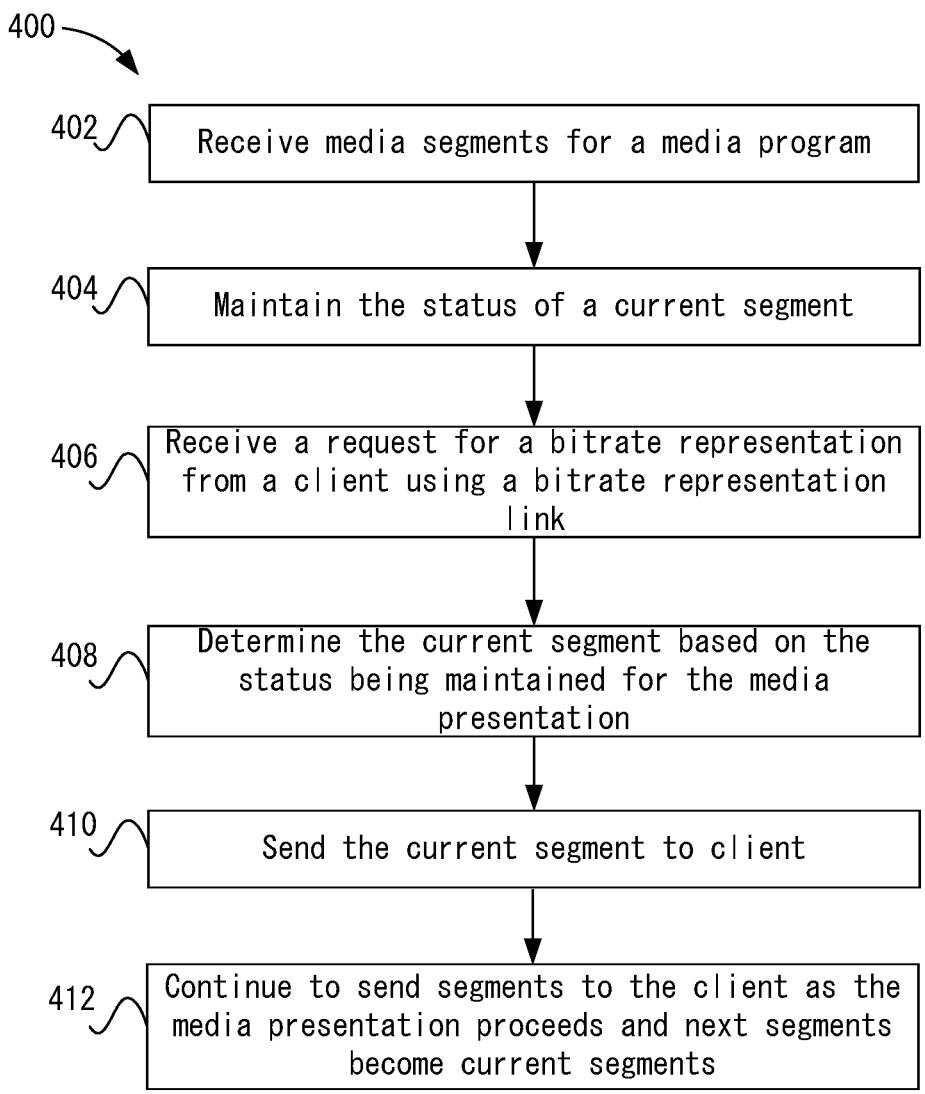
FIG. 4A depicts a simplified flowchart of a method for providing media segments to clients 104 according to one embodiment.

Using the pointer to the current segment, media service 106 can respond to requests from clients 104 and provide media segments to clients 104 according to one embodiment. FIG. 4A depicts a simplified flowchart 400 of a method for providing media segments to clients 104 according to one embodiment. At 402, server 102 receives media segments for a media program. In one embodiment, media segments may be received during a time sensitive broadcast of the media program. In one example, the event may be live and media segments are generated in real-time. In another embodiment, the media segments may be for a linear media program and may be retrieved from storage.

At 404, media service 106 maintains the status of a current segment. For example, a pointer to the current segment is used to keep track of the current segment in the media presentation.

At 406, media service 106 receives a request for a bitrate representation from a client 104 using a bitrate representation link. As discussed above, the bitrate representation link received by media service 106 from client 104 indicates the bitrate stream for the media program, but not a specific media segment.

At 408, media service 106 determines the current segment based on the status being maintained for the media presentation. For example, media service 106 uses the pointer to select the current segment. Then, at 410, media service 106 sends the current segment to client 104. At 412, media service 106 continues to send segments to client 104 as the media presentation proceeds and next segments become current segments. The above process may be repeated for multiple clients 104 as requests are received. As will be discussed below, the latency between clients 104 that are displaying the media program may be at a maximum of the length of one media segment.

Handling of Multiple Client Requests

Figure 4B:
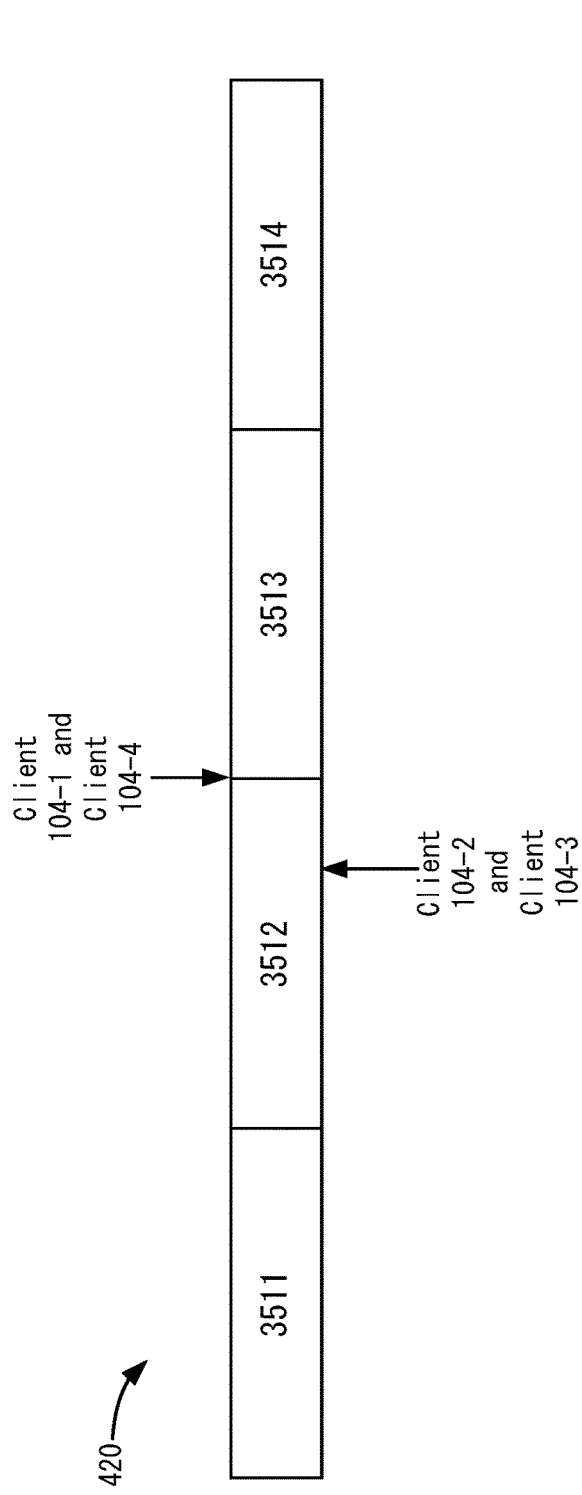
FIG. 4B is an example describing the latency when multiple clients request a bitrate representation from the media presentation and the current segment pointer is used according to one embodiment.

FIG. 4B is an example describing the latency when multiple clients 104 request a bitrate representation from the media presentation and the current segment pointer is used according to one embodiment. A timeline 420 for each client time location at the moment of 12:00:10 is shown. First, a client 104-1 sends a request for a bitrate representation at the time 12:00:00. Client 104-1 receives and starts playback of segment 3512.

Second, client 104-2 sends a request and receives a bitrate representation at time 12:00:07. Client 104-2 receives and starts playback of segment 3512. This is because the pointer to the current segment is still at segment 3512. The playback of segment 3512 at client 104-2 is seven seconds behind client 104-1, however.

Third, client 104-3 sends a request for a bitrate representation at time 12:00:07. Client 104-3 receives segment 3512 similar to client 104-2. Client 104-3 is similarly seven seconds behind client 104-1 in playback of the media program.

Lastly, client 104-4 sends a request for a bitrate representation at time 12:00:10. Client 104-4 receives segment 3513 and can start playback of that segment. Client 104-4 receives segment 3513 because media service 106 has moved the status of the current segment to segment 3513 after the 10 seconds of playback for segment 3512 elapses. In this case, client 104-4 is synchronized with client 104-1. However, client 104-4 is 3 seconds ahead of clients 104-2 and 104-3. This is because at time 12:00:17, media service 106 will send segment 3513 to clients 104-2 and 104-3. Accordingly, the time difference for playback of the media program is reduced to 3-7 seconds in this case, which is less than a length of a media segment.

Figure 4C:
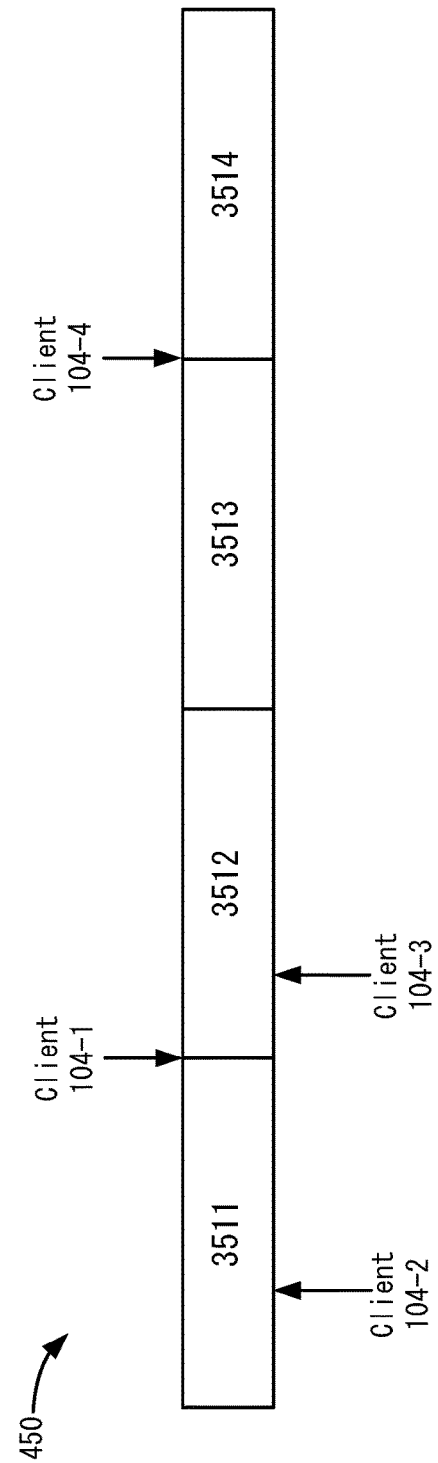
FIG. 4C is a conventional example describing the latency when multiple clients request a bitrate representation from the media presentation and the current segment pointer is not used according to one embodiment.

FIG. 4C is a conventional example describing the latency when multiple clients 104 request a bitrate representation from the media presentation and the current segment pointer is not used according to one embodiment. A timeline 450 for each client time location at the moment of 12:00:10 is shown. Client 104-1 requests and receives the manifest file at time 12:00:00, and it starts playback of segment 3511. Client 104-2 requests and receives the manifest file at time 12:00:07, and it also starts playback of segment 3511, but compared with client 104-1, client 104-2 is 7 seconds behind. Client 104-3 requests and receives the manifest file at time 12:00:07, and client 104-3 starts playback of segment 3512. At this moment, client 104-3 is 3 seconds ahead of client 104-1 and 10 seconds ahead of client 104-2. Client 104-4 requests and receives the manifest file at time 12:00:10, and client 104-4 is very aggressive and starts playback of segment 3514. At this moment, client 104-4 is 20 seconds ahead of client 104-1, 27 seconds ahead of client 104-2, and 17 seconds ahead of client 104-3. Accordingly, the time difference of playback among these clients is between 3-27 seconds.

Explicit Signaling or Implicit Signaling

In one embodiment, media service 106 may continually send segments upon receiving a request for a bitrate representation. That is, clients 104 do not need to continually send requests for segments once the initial request for the bitrate stream is sent. This saves bandwidth over conventional techniques in that only one request needs to be sent instead of multiple specific requests for specific segments. However, a representation for termination of the media streaming needs to be provided. For example, in an explicit signaling, the streaming termination may be performed by a bitrate representation with a pre-defined link, such as a link that indicates to media service 106 the streaming should stop. For example, a link that includes a command of "Stop Streaming" in it may indicate to media service 106 that streaming should be stopped. The command may include any content that indicates streaming should be stopped.

Particular embodiments may also use an implicit signaling method to discontinue the continuous streaming. The implicit signaling may use a representation that is defined by a bitrate that indicates to media service 106 that streaming should be stopped. For example, a zero bitrate representation link may be included in the manifest file. Client 104 can use the zero bitrate representation link to indicate that streaming should be stopped.

Figure 5:
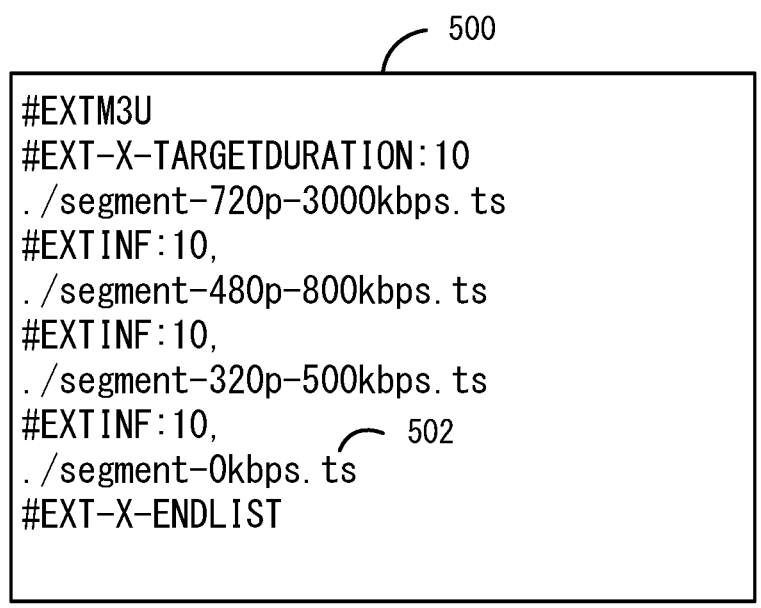
FIG. 5 shows an example of a manifest file that can be used for implicit signaling to stop streaming according to one embodiment.

FIG. 5 shows an example of a manifest file 500 that can be used for implicit signaling to stop streaming according to one embodiment. At 502, an additional bitrate representation link has been added to manifest file 500. This includes the bitrate identifier of 0 kbps, which indicates to media service 106 that streaming should stop. Although 0 kbps is used, it will be understood that other identifiers may also be used to indicate that client 104 wants to stop streaming or stop the delivery of media segments.

Bitrate Switching

In addition to providing functionality to respond to a client's request of a bitrate representation, media service 106 also allows clients 104 to switch bitrates during streaming. The bitrate switching may involve three parts, monitoring the network conditions, making a switching decision to switch bitrates, and the act of switching bitrates. Client 104 may perform the first two parts of monitoring the network conditions and making a switching decision. However, server 102 handles the third action of performing the bitrate switch. When server 102 receives a request for the bitrate switch, such as a bitrate representation link for a different bitrate stream than the current one, server 102 starts looking for the next media segment boundary while it continues to send the current segment. For example, the manifest file in FIG. 2 may include the duration of the segments at 202, which is used to determine the media segment boundary. Other metadata approaches may also help to determine the media segment boundary in order to achieve the seamless switch among different bitrate representations of video content. At the media segment boundary, server 102 sends the next media segment of the new bitrate after it finishes sending the last media segment of the current bitrate. In this case, server 102 decides when to perform the act of switching bitrates, and not client 104.

Chunked Transfer Method

Particular embodiments may use chunked transfer encoding (CTE) where media segments are sent in a series of chunks. A normal HTTP transaction, e.g., a HTTP GET followed by a HTTP REPLY, supports one piece of media download, such as a media segment or a media file. For continuous downloading of time sensitive media programs, such as live or linear media content, chunked transfer encoding may send multiple chunks for a single media segment. Thus, a segment may include multiple chunks which divide the segment into smaller pieces, such as one second chunks.

In one embodiment, particular embodiments use HTTP headers in place of a content length header. Because the content length header is not used, server 102 does not need to know the length of the content before it starts transmitting in response to client 104. Server 102 can begin transmitting dynamically-generated content before knowing the total size of the content. The size of each chunk is sent right before the chunk itself so that client 104 can tell when it has finished receiving data for that chunk. The data transfer may be terminated by a final chunk length of 0.

Particular embodiments do not need to change the manifest file depicted in FIG. 2 to incorporate chunk transfer encoding. Because particular embodiments do not have the client identify specific segments, similarly clients 104 do not need to select specific chunks. Rather, clients 104 again select a bitrate representation link for the desired bitrate.

Using the chunked transfer method, client 104 initiates a request to receive a manifest file and selects one of the bitrate representations in the manifest file to start playback. For example, client 104 asks for the delivery of a media program via a bitrate representation link. The bitrate representation link does not reference a media chunk, but rather just the bitrate representation.

Media server 102 supports chunked transfer encoding and client 104 does not need to repeat the media segment request. Rather, server 102 can keep pushing the chunks for the media segments one after another until client 104 wants to switch to another bitrate stream and sends a request for a new bitrate representation link or client 104 wants to stop receiving the chunks for the media segments and sends a request that causes server 102 to stop sending the media program.

When media service 106 receives the request using the bitrate representation link, media service 106 determines the current chunk for the current segment based on the pointer to the current chunk. Then, media service 106 keeps sending the current chunk until an event occurs to stop such that a new bitrate is requested or client 104 wants to stop receiving the media program.

If media service 106 receives a request for a bitrate stream switch, media service 106 may continue to finish sending chunks in the current segment for the current bitrate. Then, media service 106 switches to a chunk for another media segment for the new requested bitrate at the segment boundary. Media service 106 continues to send chunks from the new bitrate segment.

Figure 6A:
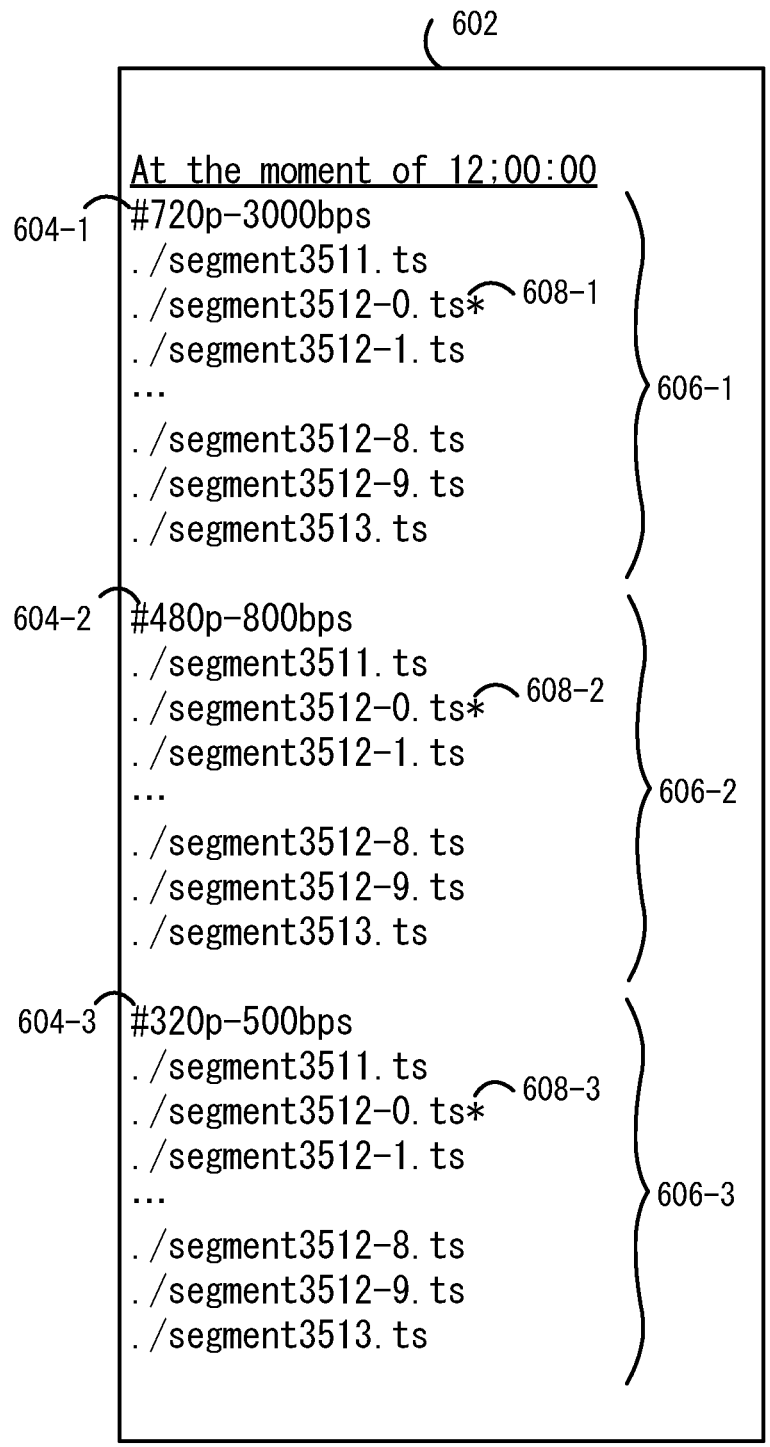
FIGS. 6A-6C show an example of maintaining the current chunk of the current segment according to one embodiment.
Figure 6B:
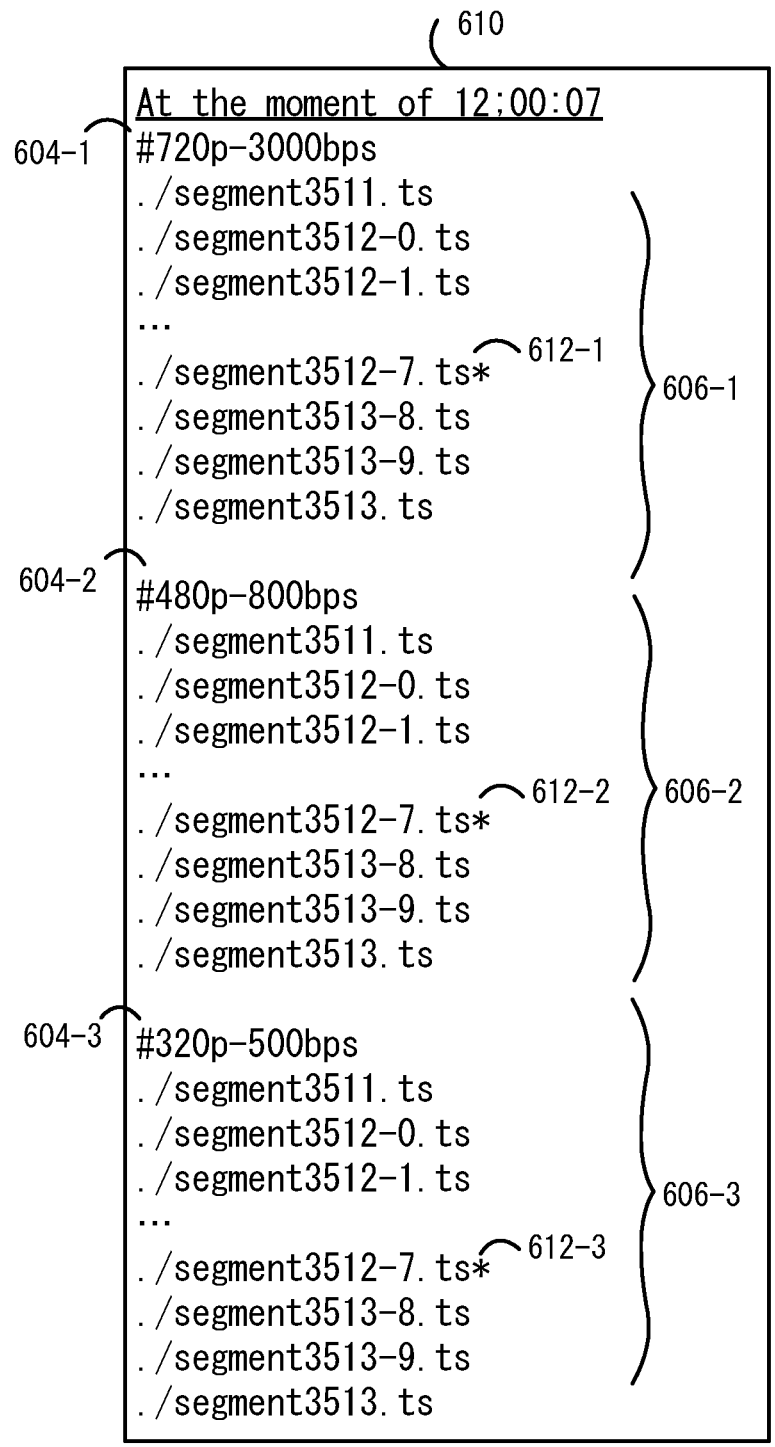
Figure 6C:
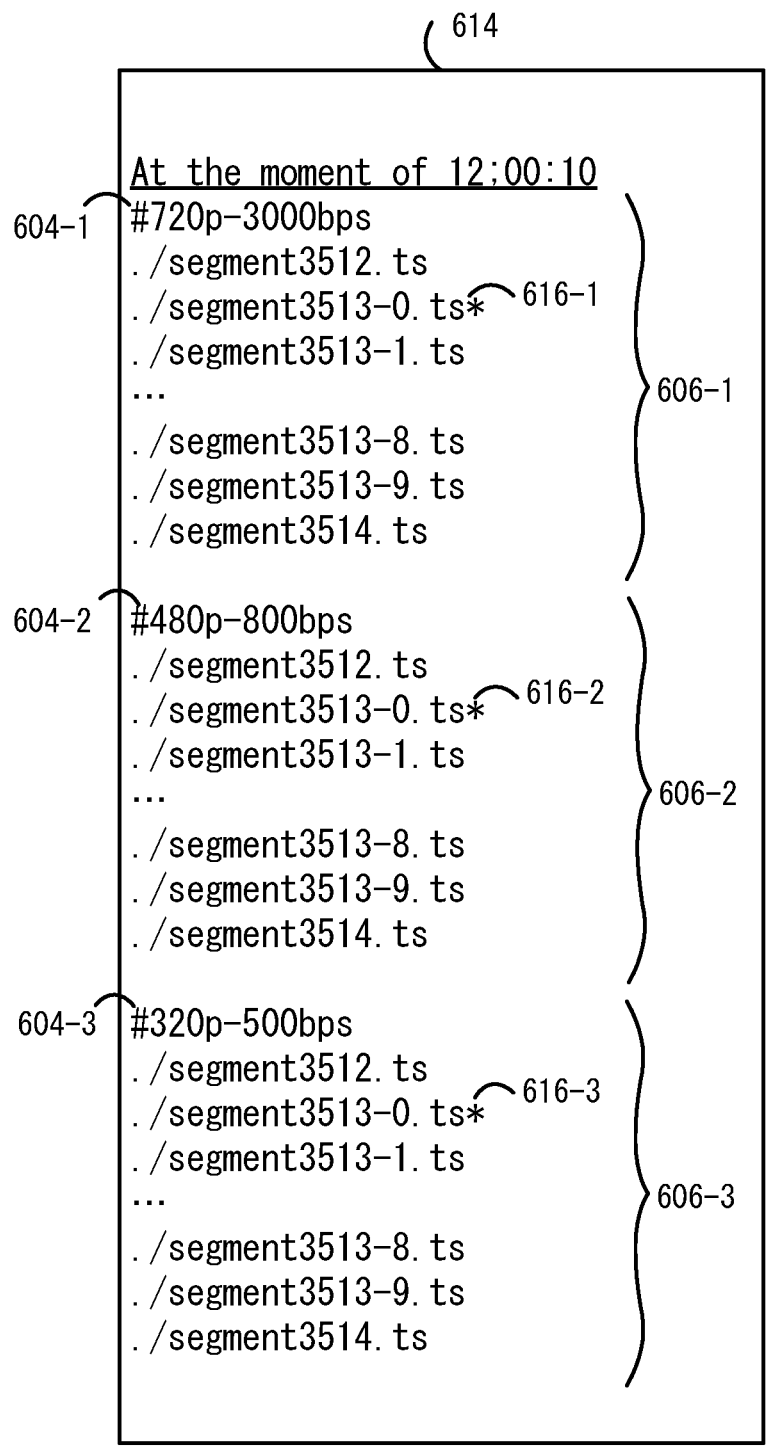

Media service 106 maintains the status of the current chunk, such as maintaining a pointer to one current chunk within a current segment to represent the current moment of the media program presentation time. FIGS. 6A-6C show an example of maintaining the current chunk of the current segment according to one embodiment. In FIG. 6A, at 602, the current chunk is shown at the moment of 12:00:00 of the media presentation. As was described in FIGS. 3A-3B, different bitrate representations are shown at 604-1, 604-2, and 604-3. Within each bitrate representation, a segment is divided into multiple chunks. In this example, each 10 second segment is divided into ten 1-second chunks at 606-1, 606-2, and 606-3 for the respective bitrate streams. In one embodiment, the 10 second segment is incrementally delivered by 1 second chunks. For simplicity, chunks are only shown for segment 3512, and not expanded for segment 3511 and segment 3513. For example, a first chunk in segment 3512 is 3512-0; a second chunk is 3512-1; and so on, until chunk 3512-9 is reached. After chunk 3512-9 is reached, then a chunk 3513-0 for a new segment 3513 will be sent.

A pointer "*" shows the current status of the pointer to a single chunk. In this case, at 608-1, 608-2, and 608-3, the pointer "*" for each respective bitrate stream points to segment 3512-0 as the current chunk of the current segment.

In FIG. 6B, at 610, the current chunk status is shown at the moment of 12:00:07, which is 7 seconds after the prior moment. Accordingly, at 612-1, 612-2, and 612-3, the pointer "*" for the current chunk points to segment 3512-7, which is the eighth chunk in the media segment.

In FIG. 6C, at 614, the current chunk status is shown at the moment of 12:00:10, which is 10 seconds after the moment shown at 602. In this case, a new segment is being sent. At 616-1, 616-2, and 616-3, the pointer "*" to the current chunk points to a new chunk 3513-0 in a new media segment 3513.

Accordingly, all clients 104 receive the same media chunk if their initial bitrate representation request falls within the media chunk interval. Since the chunk size is smaller than the media segment size, the synchronization gap may be further reduced compared with not using chunks. Using the same example discussed above, client 104-1 sends a request for a bitrate stream at time 12:00:00 and receives a first chunk 3512-0 of media segment 3512. Client 104-2 sends a request for the same bitrate stream at a time 12:00:07. Client 104-2 receives and starts playback of a chunk 3512-7 of media segment 3512. Client 104-1, which started 7 seconds earlier with chunk 3512-0, also plays back the same chunk 3512-7 as client 104-2.

Client 104-3 sends the same bitrate representation request at time 12:00:07 and performs the same as client 104-2. Client 104-4 sends a request for the same bitrate representation at a time 12:00:10. Client 104-4 receives and starts playback of chunk 3513-0 of segment 3513. Since this request is 10 seconds after the request of client 104-1, at this moment, clients 104-1, 104-2, and 104-3 also start playback of the same chunk 3513-0. Accordingly, this achieves playback synchronization among all playback clients. There may be a less than chunk size time difference at playback between clients 104; however, this is less than the synchronization gap if only media segments were being used.

FIG. 6D is an example describing the latency when multiple clients 104 request a bitrate representation from the media presentation and the current segment pointer and chunked transfer method is used according to one embodiment. A timeline 650 for each client time location at the moment of 12:00:10 is shown for the scenario described in FIGS. 6A-6C. Similar to FIGS. 6A-6C, only segment 3512 is segmented into 10 chunks at 652. Because the chunked transfer method is used, clients 104-1, 104-2, 104-3, and 104-4 are synchronized at the first chunk of segment 3513. It is possible that some clients may be unsynchronized by less than a chunk size length, however. The chunk length can be defined per synchronization requirement, such as it can be further reduced down to half second or smaller, if needed. In one case, a client 104 may not be able to decode a chunk in the middle of segment if that chunk is the first received for the 10 second segment. But, techniques may be used to allow display faster, such as a separate fast turn in representation or including a couple of open group of pictures (GOPs) (e.g., streaming access points (SAP) type 3) within the 10 second segment. A fast turn in representation is a separate representation of the same media program with smaller GOPs, which allows for fast turn in for client, besides the adaptive bitrate representations. The client may receive fast turn in representation first when initially it receives the media program, then the client switches to one of adaptive bitrate representations on next segment boundary. The tuning time of client 104 may thus vary when chunks in the middle of the 10 second segment are received first.

Figure 7A:
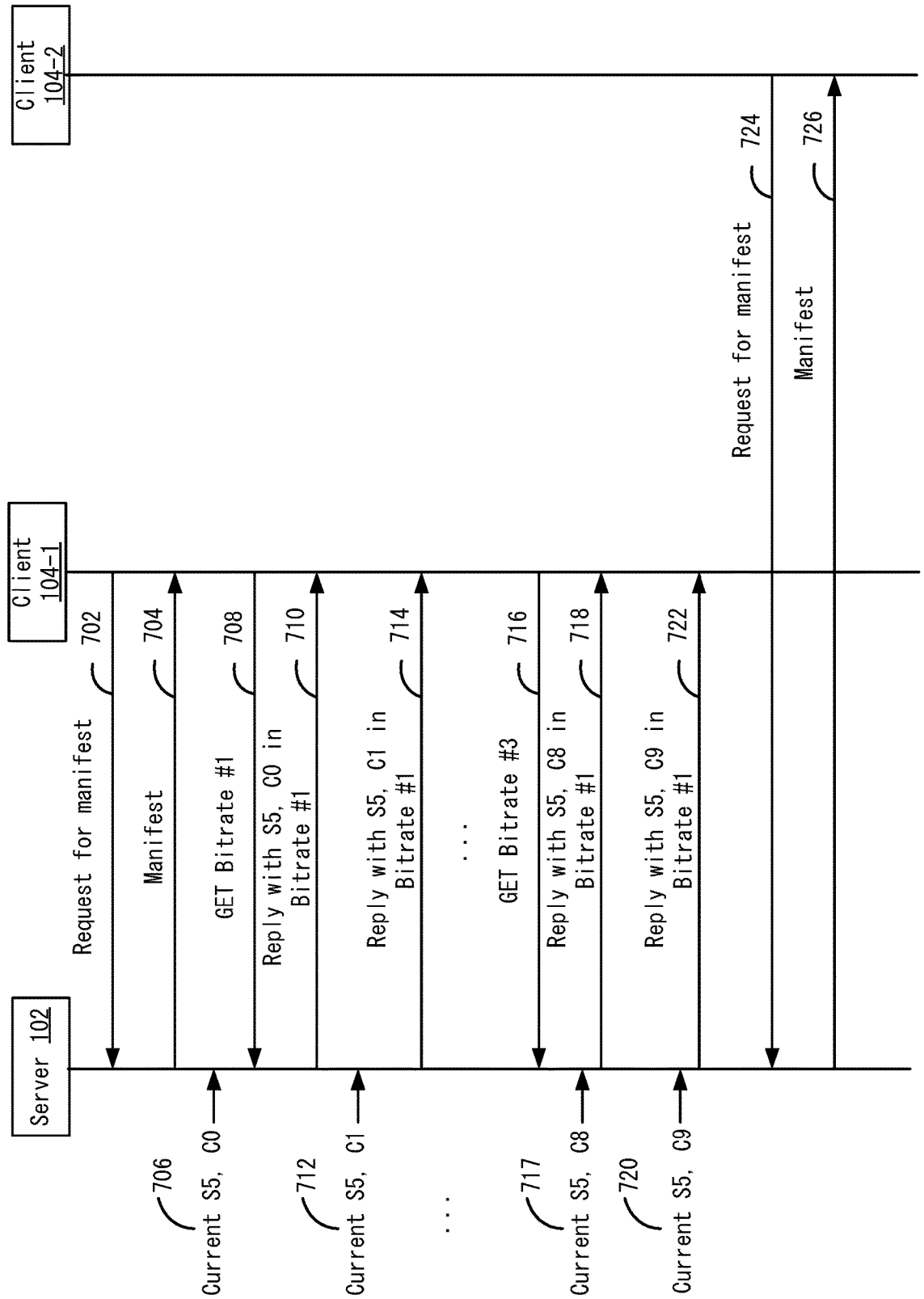
FIGS. 7A and 7B show a message flow for the chunked transfer method according to one embodiment.
Figure 7B:
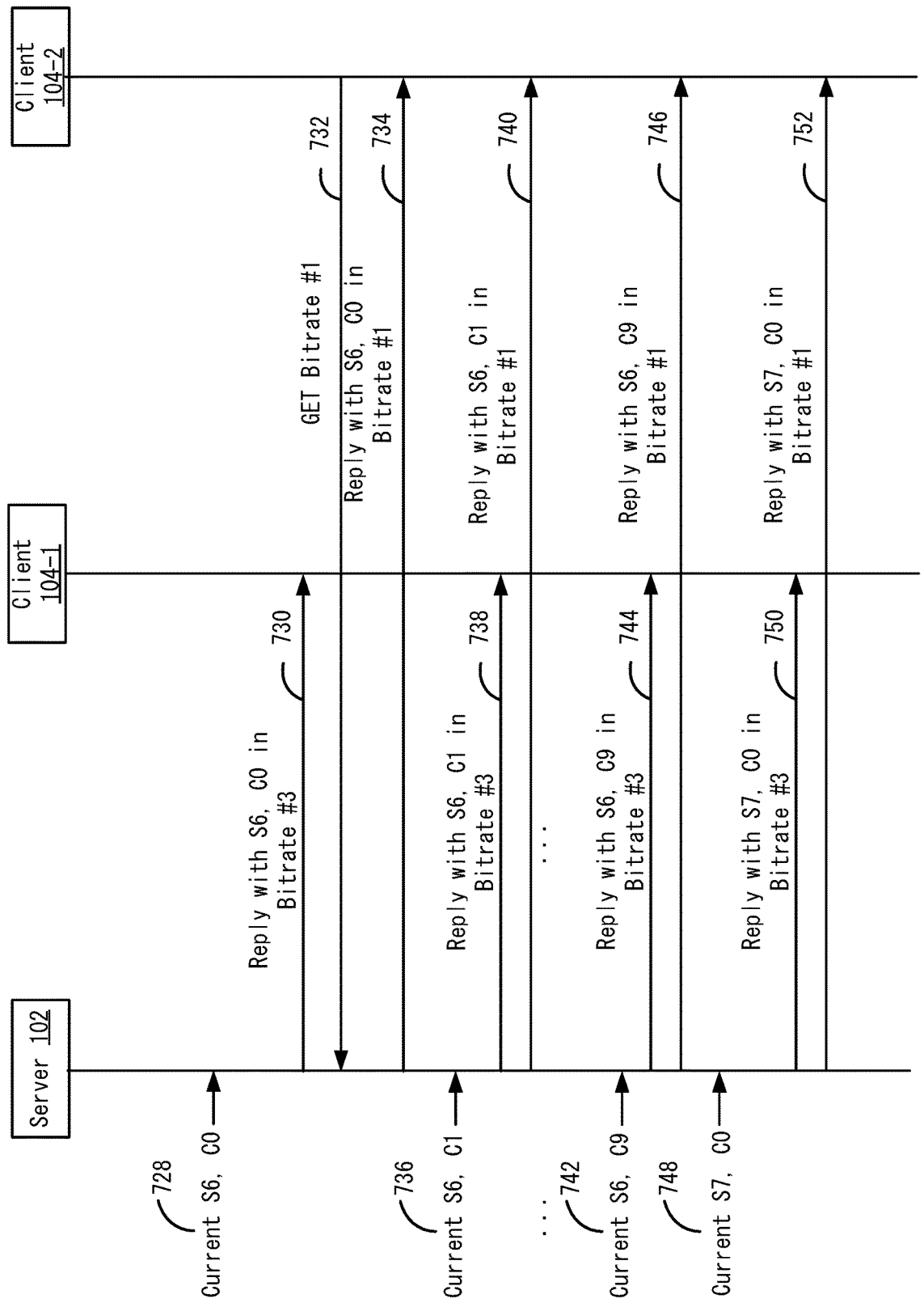

FIGS. 7A and 7B show a message flow for the chunked transfer method according to one embodiment. Client 104 and server 102 initiate a media channel, where server 102 can actively push the media program to client 104, which may be enabled by HTTP/2 server push or Web Socket messaging. The media channel may be established via the HTTP/1.1 protocol upgrade mechanism, such as Chunked Transfer Encoding, or by some other means. In FIG. 7A, after the connection is established, at 702, client 104-1 sends a request for a manifest file. Client 104 may also request a push strategy. The push strategy informs server 102 about how the client would like media delivery to occur, which in this case, may be the server centric push strategy. At 704, server 102 responds with the manifest file that includes the bitrate representation links. The response may also include confirmation of the push strategy. In other embodiments, server 102 may decide on which push strategy to use instead of client 104.

In this example, it assumes each media segment is divided into 10 delivery chunks. Server 102 maintains a timeline of pointers for the current chunk of current segment, such as segment 5, chunk 0 (S5, C0); segment 5, chunk 1 (S5, C1), etc.

At 706, server 102 receives a current chunk C0 for a media segment S5. At 708, client 104-1 sends a bitrate representation link request for a bitrate #1. In one embodiment, client 104-1 may use a HTTP GET request for the bitrate stream. At 710, server 102 sends a reply with the current chunk of S5, C0 in bitrate #1. The reply may be an HTTP REPLY that supports one piece of media download.

At 712, server 102 receives a current chunk of S5, C1. Then, without client 104-1 requesting this current chunk, at 714, server 102 sends a reply with current chunk S5, C1 in bitrate #1. This process continues as additional chunks for the media segment are received at server 102 and sent to client 104-1.

At 716, client 104-1 decides to switch bitrates from bitrate #1 to bitrate #3. In this case, client 104-1 sends a bitrate representation link, such as an HTTP GET bitrate #3 request, to server 102. In one embodiment, server 102 finishes sending chunks from the media segment in bitrate #1 before switching to bitrate #3. For example, at 717, server 102 receives chunk S5, C8 and at 718, sends a reply with current chunk S5, C8 in bitrate #1. Then, at 720 and 722, server 102 receives a current chunk S5, C9 and replies with the current chunk S5, C9 in bitrate #1. This ends the current media segment S5.

Another client may also send a request for the media program. For example, at 724, client 104-2 sends a request for a manifest file to server 102. At 726, server 102 responds with a manifest file that includes the bitrate representation links.

Referring to FIG. 7B, at 728, server 102 receives a current chunk S6, C0. This is a new chunk for a new media segment. Server 102 can then switch client 104-1 to the new requested bitrate #3. At 730, server 102 replies with the current chunk S6, C1 in bitrate #3.

At 732, client 104-2 sends a bitrate representation link for bitrate #1, such as an HTTP GET request for bitrate #1. At 734, server 102 replies with the current chunk S6, C1 in bitrate #1. At 736, the process continues as server 102 receives chunk S6, C1 and at 738, sends a reply with current chunk S6, C1 in bitrate #3 to client 104-1. Also, at 740, server 102 sends a reply with current chunk S6, C1 in bitrate #1 to client 104-2. The rest of the chunks for the media segment are received and sent. For example, at 742, server 102 receives chunk S6, C9 and at 744, sends a reply with current chunk S6, C9 in bitrate #3 to client 104-1. Also, at 746, server 102 sends a reply with current chunk S6, C9 in bitrate #1 to client 104-2.

When a new media segment is presented, server 102 updates the pointer to the new chunk. At 748, server 102 receives chunk S7, C0 and at 750, sends a reply with current chunk S7, C0 in bitrate #3 to client 104-1. Also, at 752, server 102 sends a reply with current chunk S7, C0 in bitrate #1 to client 104-2. These chunks are sent without further request from clients 104-1 and 104-2.

Since the current chunk of the current segment is maintained by and sent by server 102, both client 104-1 and client 104-2 receive the current chunk of the same media content even in the case that they have requested a different bitrate at a different time. The time difference of playback among these clients is less than the size of the media chunk.

Accordingly, the signaling of server centric push of media segments can be either explicit or implicit, and media service 106 implements a push management function in the server side to support the media segment push and the bitrate switching. The bitrate representation link request from client 104 to server 102 asks only for a bitrate representation, and not a specific media segment. Thus, the request triggers the chunked transfer method (e.g., HTTP CTE) to start and maintain a media channel between client 104 and server 102, and lets server 102 keep pushing chunks for media segments. The push strategy is not negotiable and defaults to "pushing the current chunk of current segment". The change of bitrate or termination of the push is achieved by the client signal and the reactions of server. In one embodiment, a push-type, such as push-current, allows server 102 to control and select the current segment and keep pushing the current segments until further notification.

The bitrate representation link may be a push type message, such as a push-current message, that may contain a parameter that indicates which bitrate representation to push. This message allows the server to control and select the current segment, and the server keeps pushing the media segments until further notification. Also, in another embodiment, a push-next, push-template, or push-time may be used to indicate server-controlled media segment selection and delivery. These messages may support an option of continuous pushing until further notification. Also, a push-none message may indicate the termination of a current push.

Accordingly, particular embodiments provide a server-centric push method for sending media segments using adaptive bitrate streaming. This method reduces the messaging overhead because clients 104 do not need to request every specific segment. Further, the synchronization gap among clients is also reduced by server 102 maintaining the current segment. Further, using chunked transfer encoding, the synchronization gap may be further reduced.

System

FIG. 8 illustrates an example of a special purpose computer systems 800-1-800-3 according to one embodiment. In one embodiment, computer system 800-1 describes server 102. Also, computer systems 800-2 and 800-3 describe clients 104. Only one instance of computer system 800 will be described for discussion purposes, but it will be recognized that computer system 800 may be implemented for other entities described above.

Computer system 800 includes a bus 802, network interface 804, a computer processor 806, a memory 808, a storage device 810, and a display 812.

Bus 802 may be a communication mechanism for communicating information. Computer processor 806 may execute computer programs stored in memory 808 or storage device 808. Any suitable programming language can be used to implement the routines of particular embodiments including C, C++, Java, assembly language, etc. Different programming techniques can be employed such as procedural or object oriented. The routines can execute on a single computer system 800 or multiple computer systems 800. Further, multiple computer processors 806 may be used.

Memory 808 may store instructions, such as source code or binary code, for performing the techniques described above. Memory 808 may also be used for storing variables or other intermediate information during execution of instructions to be executed by processor 806. Examples of memory 808 include random access memory (RAM), read only memory (ROM), or both.

Storage device 810 may also store instructions, such as source code or binary code, for performing the techniques described above. Storage device 810 may additionally store data used and manipulated by computer processor 806. For example, storage device 810 may be a database that is accessed by computer system 800. Other examples of storage device 810 include random access memory (RAM), read only memory (ROM), a hard drive, a magnetic disk, an optical disk, a CD-ROM, a DVD, a flash memory, a USB memory card, or any other medium from which a computer can read.

Memory 808 or storage device 810 may be an example of a non-transitory computer-readable storage medium for use by or in connection with computer system 800. The non-transitory computer-readable storage medium contains instructions for controlling a computer system 800 to be configured to perform functions described by particular embodiments. The instructions, when executed by one or more computer processors 806, may be configured to perform that which is described in particular embodiments.

Computer system 800 includes a display 812 for displaying information to a computer user. Display 812 may display a user interface used by a user to interact with computer system 800.

Computer system 800 also includes a network interface 804 to provide data communication connection over a network, such as a local area network (LAN) or wide area network (WAN). Wireless networks may also be used. In any such implementation, network interface 804 sends and receives electrical, electromagnetic, or optical signals that carry digital data streams representing various types of information.

Computer system 800 can send and receive information through network interface 804 across a network 814, which may be an Intranet or the Internet. Computer system 800 may interact with other computer systems 800 through network 814. In some examples, client-server communications occur through network 814. Also, implementations of particular embodiments may be distributed across computer systems 800 through network 814.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
providing, by a computing device, a manifest for a media program to a client, the manifest including a set of bitrate representation links that correspond to a set of bitrates;
maintaining, by the computing device, a pointer to a current segment or a chunk of the current segment that is currently being presented in the media program;
receiving, by the computing device, a request using a bitrate representation link in the set of bitrate representation links;
selecting, by the computing device, the current segment or the chunk of the current segment using the pointer for the bitrate that corresponds to the bitrate representation;
sending, by the computing device, the current segment or the chunk of the current segment to the client;
continuing to send subsequent media segments after receiving the request until another request from the client is received, wherein the another request is a request to stop sending the media segments at the bitrate;
wherein:
the bitrate comprises a first bitrate, and the bitrate representation link comprises a first bitrate representation link, and
the another request is sent using a second bitrate representation link that corresponds to a second bitrate that is different from the first bitrate;
the method further comprising:
switching, by the computing device, to the second bitrate when the second bitrate representation link is received; and
waiting, by the computing device, until a segment boundary in the media program is encountered to switch to the second bitrate, wherein at least the current segment in the first bitrate is sent to the client before switching to a next current segment in the second bitrate.

2. The method of claim 1, wherein the manifest does not include a link to any specific segment in the media program.

3. The method of claim 1, wherein the manifest includes a link to stop sending the media segments.

4. The method of claim 1, wherein the another request is sent using a command to stop sending the media program.

5. The method of claim 1, wherein the client comprises a first client, the method further comprising:
receiving a second request from a second client using the bitrate representation link corresponding to the bitrate;
selecting the current segment or the chunk of the current segment using the pointer for the bitrate that corresponds to the bitrate representation; and
sending the current segment or the chunk of the current segment to the second client.

6. The method of claim 5, wherein:
the current segment or the chunk of the current segment sent to the second client is the same segment or from the same segment sent to the first client if the second request is received while the current pointer is pointing to the current segment sent to the first client, and
the current segment or the chunk of the current segment sent to the second client is a different segment or from a different segment than the current segment sent to the first client if the second request is received while the current pointer is pointing to the different segment.

7. The method of claim 1, wherein:
each media segment includes a plurality of chunks within each bitrate,
the pointer points to a current chunk being presented, and the current chunk is sent to the client.

8. The method of claim 7, wherein maintaining the pointer comprises:
moving the pointer to the current chunk being presented in the media program.

9. The method of claim 1, wherein maintaining the pointer comprises:
moving the pointer to the current media segment being presented in the media program, wherein the pointer remains at the current media segment until a next media segment begins presentation.

* * * * *